Patented Mar. 3, 1942

2,274,634

UNITED STATES PATENT OFFICE 2,274,634

CATALYTIC CONVERSION PROCESS

Llewellyn Heard, Hammond, Ind., assignor to Standard Oil Company, Chicago, Ill., a corporation of Indiana No Drawing. Application August 29, 1940, Serial No. 354,729

9 Claims. (Cl. 196—52)

REISSUED
OCT 6 1942

This invention relates to an improvement in hydrocarbon conversion catalysts and the method of making the same. In particular, it relates to hydrocarbon conversion catalysts of the aluminum oxide type in which aluminum oxide is the principal ingredient of the active catalyst.

One object of the invention is to produce a more active aluminum oxide catalyst for the conversion of hydrocarbons including the dehydrogenation of gaseous hydrocarbons for the production of gaseous olefins, the dehydrogenation and aromatization of naphthas and the lower boiling normally liquid paraffinic hydrocarbons for the production of unsaturated and aromatic products, the cracking of heavier hydrocarbons such as gas oils for the production of gasoline motor fuels of high knock rating and the reforming of naphthas in general for the purpose of increasing their knock rating or "octane number" when employed as motor fuels in internal combustion engines. Another object of the invention is to provide a rapid method for the manufacture of aluminum oxide conversion catalysts, thereby reducing the cost while maintaining a high catalytic activity.

Heretofore, aluminum oxide in various forms has been particularly used for the conversion of petroleum hydrocarbons. Chemically precipitated alumina, bauxite, electrolytic aluminum process residues, etc. have been employed for this purpose. In general, the activity of the alumina used heretofore has been insufficient to permit it to be used alone and it has commonly been the practice to add certain promoters or activating agents to the alumina. In many cases the alumina has been considered only as a support for the addition agents which were incorporated with it or distributed upon it, either mechanically or by chemical means. I have now discovered that certain alumina gels, when prepared by a method hereinafter described, are possessed of unusually high catalytic activity for the conversion of hydrocarbons, and in fact, the activity of these gels or "ultragels," is so great that they may be used in some cases without the addition of a promoter or activating agent. In general, however, I prefer to employ promoters preferably incorporated in alumina gel in a specific manner as hereinafter described.

In making my catalyst, I begin with metallic aluminum which I first amalgamate with a small quantity of mercury and then convert to an alumina sol by the action of water, slightly acidulated. For this purpose 1% acetic acid is generally satisfactory. Following is a detailed description of the manner of making the alumina sol. To 5 ml. of mercury is added 10 ml. of concentrated nitric acid. After evolution of red fumes the mercury is largely converted to mercuric nitrate. About 10 ml. of water is added dissolving the solid and the product is then thrown onto 240 grams of granulated aluminum metal contained in a one liter glass vessel. Sufficient water is added to cover the metal and the mixture is stirred vigorously to insure uniform amalgamation of the aluminum. The reaction is rapid and before it becomes too violent and after the amalgamation is substantially complete, 200 ml. of water is added with stirring and the bulk of the liquid is immediately decanted. The aluminum is then repeatedly rinsed by adding water in 200 ml. quantities and decanted until a total of one liter of water has been used in this manner. The resulting aluminum amalgam must be transferred immediately to the solution already prepared for converting it into the alumina sol.

The solution required for making the sol consists of 16 liters of distilled water and 180 ml. glacial acetic acid contained in a 20 liter flask and heated by a water bath to maintain the temperature at about 122° F. The acetic acid solution is stirred slowly by a mechanical device. As soon as the amalgam is prepared as described above, it is thrown into this solution and stirred constantly for about 24 hours. About 15 minutes after adding the amalgam a layer of froth is formed on the surface of the solution indicating that the reaction is proceeding properly. After the reaction is completed the resulting sol is allowed to stand over night to settle any suspended particles, including the mercury. About 14 liters of sol is obtained as a syrupy liquid.

For the purpose of making unpromoted alumina catalyst, the sol may be coagulated to gel by the addition of ammonium hydroxide. For this purpose ordinary 27° Baumé ammonium hydroxide is diluted with an equal volume of water and sufficient is added to adjust the hydrogen ion concentration to a pH of about 6.8 to 7.8. The liquid is stirred rapidly while the ammonium hydroxide is added until a gelatinous, thick mass is obtained making further stirring practically impossible. Excess stirring must be avoided, otherwise, an amorphous product will be obtained rather than the desired gel.

The product may be filtered immediately to remove the bulk of the water leaving the alumina gel as a coherent cake of about 1 liter in volume when filtered on a suction filter. Without washing, the cake is broken up into pieces, about 2 to 4 centimeters in size and dried over night at a temperature not exceeding 150° F. It is finally dried on a steam bath to a dull grey, granular mass consisting of pieces of about 2 centimeters in size. Adsorbed and occluded ammonium acetate left in the gel is removed by heating to an elevated temperature, for example, 800 to 900° F. The gel first becomes black, due to charring and subsequently colorless and transparent after carbonaceous matter has been eliminated by combustion in air. After grading or crushing to obtain the desired size the catalyst is now ready for use in converting hydrocarbons.

It is usually desirable to employ promoting metals in the alumina catalyst and these are incorporated by adding a solution containing the desired metal or metals to the alumina sol before coagulation. Ammonium molybdate, ammonium chromate, ammonium vanadate and ammonium tungstate are examples of metal salts which may be used for the purpose. Cobalt, nickel, magnesium, copper, manganese and other metals may be used similarly, and in general, the transition elements of the 3rd to the 6th groups of the periodic system may be used as promoters. The promoters are preferably added in the form of their nitrates or freshly precipitated hydroxides or oxides. Thus, magnesium oxide may be mixed thoroughly with the alumina sol and coagulation effected by adding ammonia.

The amount of promoter solution added to th alumina sol should be only sufficient to induce coagulation to gel. If an excess is used, it will result in the formation of a friable precipitate rather than a firm vibratory gel and when the resulting product is dried and ignited, it will lack the desired physical strength for the treatment of hydrocarbons in an economic manner.

Where a lesser amount of promoting metal is desired on the alumina, this may be obtained by adding an insufficient amount of the promoting metal salt solution and then effecting coagulation of the alumina sol by the addition of ammonium hydroxide. Instead of employing ammonium hydroxide as a coagulant, I may also employ solutions of certain other coagulating salts such as ammonium chloride, ammonium nitrate, aluminum chloride, ammonium citrate, aluminum acetate, magnesium acetate, ammonium oxalate, ammonium tartrate, ammonium carbonate or mixtures of them. Too high acidity must be avoided and the pH may be adjusted by adding ammonium hydroxide to the other coagulating electrolytes, thereby controlling the speed of setting. At a pH of 5 to 6.5 the rate of gelling may be very slow requiring a day or more even with electrolyte present. Excessive alkalinity should also be avoided for the same reason, a pH of 8.5 being about the upper limit at which successful gelling can be obtained.

As an example of preparing an alumina gel promoted with molybdenum oxide, I may dissolve 26½ grams of ammonium paramolybdate in sufficient water to produce 240 ml. of solution. To this is added 3½ liters of the alumina sol previously described. The mixture is rapidly stirred as long as possible until it becomes too thick for further stirring. It is then filtered immediately on a suction filter pressing the cake to remove as much water as conveniently possible. No washing is necessary and the gel may be immediately dried to a hard, glassy, translucent solid which contains about 15% molybdenum oxide. Final drying may be accomplished by gradual air drying at 90 to 100° F. until no further shrinkage in the volume of the gel is detectable. From 2 to 4 days are required for this step in the manufacture of my catalyst. More rapid drying is not desirable if a coarsely granular product is necessary. In the case of powdered catalysts and finely granulated catalysts more rapid drying may be employed. After the preliminary drying the catalyst is dried at about 200° F. for about 24 to 48 hours. It is then placed in an oven provided with an air stream and heated to about 1000° F. within a half hour. The catalyst is held at this temperature for about 8 to 12 hours while a stream of air is passed through it. The amount of molybdenum oxide which may be incorporated in this way is usually about 5 to 50%, although 10 to 25% is usually sufficient to give high activity.

In preparing the alumina sol from amalgamated aluminum, I prefer to use an acid of low ionization constant, such as acetic acid. Other organic acids, such as formic or tartaric acid, may be used. I may also use aluminum acetate or other aluminum salt solution, preferably of an organic acid, for treating the amalgamated aluminum metal, thereby deriving a part of the alumina gel from the aluminum salt and a part from the aluminum amalgam.

Catalysts made according to my process have shown extremely great activity for cracking, dehydrogenation and aromatization of petroleum hydrocarbons. These catalysts may be used at either atmospheric or super-atmospheric pressure. The super-atmospheric pressure may be obtained by adding hydrogen. Hydrocarbon oils are generally passed through the catalyst at the space velocity of about 0.1 to 5.0 volume of oil per apparent volume of catalyst per hour, the preferred charging rate being about 0.5 to 2.5 volume per volume per hour. Temperatures within the range of 850 to 1150° F. are usually employed, particularly temperatures of about 900 to 1050° F. In the case of aromatization of naphthas, hydrogen may be employed at partial pressures of about 50 to 450 pounds per square inch, the preferred range being about 175 to 250 pounds per square inch.

In the preparation of my catalyst, I have found that the manner of coagulating the alumina sol has a very important effect on the appearance and physical strength of the catalyst as well as its catalytic activity. Too rapid coagulation and coagulation under unfavorable conditions of hydrogen ion concentration result in the formation of less hydrated aluminum hydroxide gels. The most effective catalysts result from uniform, firm, vibrant jellies which are substantially transparent. Practically no fluid separates from such jellies, and, therefore, it is not necessary to filter before drying. The following describes a procedure for making such catalysts which have been activated by vanadium:

To a warm solution of 13.5 grams of ammonium metavanadate and 300 ml. distilled water, there is added 5 to 10 drops of glacial acetic acid changing the color from light yellow to orange red. This solution is added, with rapid stirring, to 3.5 liters of settled alumina sol. Local coagulation occurs but the agglomerates are rapidly dispersed and redissolved. After about two minutes of agitation, the mixture becomes homogeneous after which there is added 100 ml. ammonium carbonate solution (5 grams $(NH_4)_2CO_3$ per 100 cc. $H_2O$). More local coagulation occurs but these agglomerates also are soon dispersed and the solution begins to thicken. After about 5 minutes more of stirring, the solution is poured into a flat aluminum tray with depth of about 1 centimeter. In about 30 minutes the sol is coagulated to a transparent, vibrant jelly. The gel is cut up and dried at room temperature for about 4 days. It is then ignited at a temperature of about 1000° F. On cooling, the catalyst is ready for use. It is a hard, glassy, translucent substance and has the properties of a highly porous material. The hydrocarbon conversion activity is very high as will be seen hereinafter.

As an example of the high conversion activity of these alumina gel catalysts, a molybdenum oxide-alumina gel catalyst from an earlier run was regenerated and reduced with hydrogen. Straight-run naphtha of 35 octane number was vaporized and passed through the catalyst at 1000° F. at the rate of one volume (liquid) per volume of catalyst per hour. The product was a naphtha having a knock rating of 75 octane number by the motor method. In comparison, an acid treated bentonite clay gave a product of only 65.5 octane number under the same conditions.

In still another example a vanadium-activated alumina gel, made by one of the methods described hereinabove, was employed for the reforming and aromatization of low knock rating naphtha, in one case employing atmospheric pressure and in another case employing hydrogen pressure of 200 pounds per square inch. The following results were obtained:

|  | Atmospheric pressure | Hydrogen pressure |
|---|---|---|
| Temperature_____°F__ | 1000 | 983 |
| Space velocity_____ | 1 | 0.998 |
| Knock rating—C. F. R.—M_____ | 80.1 | 82.9 |
| Yield volume_____percent__ | 53.9 | 69.4 |
| Carbon percent by weight_____ | 12.66 | 0.48 |

In additional runs the regenerated catalysts were used for the treatment of similar naphtha stock at 980° F., space velocity 1, and hydrogen pressure 200 pounds per square inch. In three consecutive runs the product obtained had an octane number of 89.1, 88.3 and 89.8. The carbon produced on the catalyst was about 1 to 4%.

The unusually high octane numbers obtained with these catalysts in reforming are significant. The pure alumina gel catalyst without promoter when used for reforming of naphtha produced a product having an octane number of 63.8, almost as good as the octane number obtained with activated bentonite containing molybdenum which, by comparison, gave an octane number of 65.5. By employing hydrogen in the reaction, my alumina gel catalyst, unpromoted, gave a product having an octane number of 75.8.

The following table presents some data on the reforming of straight-run naphtha with various catalysts. The naphtha treated had a boiling range of about 270 to 400° F. and an octane number of 35 (motor method). Hydrogen was present with the naphtha during contact with the catalyst, the pressure of hydrogen being about 200 pounds per square inch.

| Catalyst | Temperature | Space velocity | Yield weight | Knock rating C. F. R.—M | Carbon |
|---|---|---|---|---|---|
|  |  |  | Percent |  |  |
| Alumina gel_____ | 996 | 0.97 | 70.2 | 76 | 0.54 |
| Do_____ | 1,038 | 2.01 | 67.9 | 81.5 |  |
| Do_____ | 1,028 | 1.16 | 56.3 | 85.7 | 1.53 |
| Alumina gel+V₂O₅__ | 984 | 0.99 | 70.1 | 83.1 | 0.58 |
| Alumina gel+WO₃__ | 985 | 1.02 | 70.5 | 75.6 | 2.32 |
| Alumina gel+10% MoO₃_____ | 985 | 1 | 63 | 85.4 | 1.22 |

It will be noted from the above data that both the molybdena and tungstia activated catalysts produced a considerable amount of carbon on the catalyst, apparently because of their high catalytic activity, indicating that these catalysts should be employed at lower temperatures or for shorter contact times (space velocity). The molybdenum oxide-activated alumina gel produced a reformed naphtha of unusually high knock rating.

The mechanism of the reaction occurring in the preparation of my catalyst is not well understood but it is believed that an aluminum ammonium molybdate hydration product is obtained when the ammonium molybdate is added to the sol. Apparently, all the molybdenum salt is not co-gelled with the alumina gel and excess may be recovered from the filtrate removed from the gel. The filtrate may be concentrated and employed for the purpose of activating another batch of the alumina sol.

When employing my catalyst for stationary or moving bed operation, I may use it in the form of pellets or granules of suitable size. I may also deposit it on carriers such as kieselguhr, silica, silica gel, etc. For example, granular silica gel in dry form may be mixed with the alumina sol before coagulation and the product separated and dried as above described. Fifty (50) to 90% of silica gel may thus be employed.

Having thus described my invention what I claim is:

1. The method of converting hydrocarbon oils which comprises subjecting said oils at conversion temperature to the action of a solid hydrocarbon conversion catalyst of great physical strength and high activity prepared by coagulating with an electrolyte a stable alumina sol resulting from the action of water on amalgamated aluminum metal thereby producing a firm, substantially transparent, vibrant gel, separating the resulting gel from the solution and drying the gel to produce the desired catalyst in the form of a hard, granular, translucent, solid material.

2. The method of claim 1 wherein the electrolyte is ammonium hydroxide.

3. The method of claim 1 wherein the electrolyte is a metal salt selected from the class consisting of the salts of chromium, molybdenum, tungsten, vanadium, cobalt, nickel, copper and magnesium.

4. The method of claim 1 wherein the electrolyte is ammonium molybdate.

5. The method of claim 1 wherein said alumina sol is prepared by acting on amalgamated aluminum metal with water acidulated with an organic acid.

6. The method of claim 1 wherein said alumina sol is prepared by acting on amalgamated aluminum metal with a water solution of an aluminum salt.

7. The method of dehydrogenating and aromatizing hydrocarbon naphthas which comprises subjecting said naphthas at aromatizing temperature to the action of a hydrocarbon conversion catalyst prepared from a stable alumina sol resulting from the action of dilute acetic acid on amalgamated alumina metal, coagulating said sol by adding a solution of an electrolyte comprising a salt of a promoter metal, separating the resulting gel from the solution and drying and igniting the gel gradually to eliminate water and decompose occluded salts.

8. The method of converting hydrocarbon oils which comprises subjecting said oils at conversion temperature to the action of an aluminum oxide hydrocarbon conversion catalyst prepared by the coagulation of a stable alumina sol, said sol having been prepared by the action of amalgamated aluminum on acidulated water, and said coagulation having been effected by adjusting and maintaining the hydrogen ion concentration of the sol within a pH value of about 6.8 to 7.8 until said sol has coagulated to a firm, vibrant, transparent gel, separating the alumina gel from the solution and drying and igniting said gel.

9. The method of aromatizing hydrocarbon naphthas which comprises subjecting said naphthas at aromatizing temperature and in the presence of hydrogen to the action of a solid catalyst of great physical strength and high activity prepared by coagulating with an electrolyte a stable alumina sol resulting from the action of water on amalgamated aluminum metal, thereby producing a firm, substantially transparent, vibrant gel, separating the resulting gel from the solution and drying the gel to produce the desired catalyst in the form of a hard, granular, translucent, solid material.

LLEWELLYN HEARD.